US007474079B2

(12) United States Patent
Hashimoto

(10) Patent No.: US 7,474,079 B2
(45) Date of Patent: Jan. 6, 2009

(54) BATTERY CHARGER WITH BACKUP CHARGING CIRCUIT

(75) Inventor: Yuichiro Hashimoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 11/680,760

(22) Filed: Mar. 1, 2007

(65) Prior Publication Data

US 2007/0229028 A1    Oct. 4, 2007

(30) Foreign Application Priority Data

Mar. 28, 2006    (JP) ............... 2006-089154

(51) Int. Cl.
*H02J 7/00* (2006.01)
*H02J 7/04* (2006.01)
*H02J 7/06* (2006.01)

(52) U.S. Cl. ............... 320/138; 320/140; 320/162; 320/163

(58) Field of Classification Search ............... 320/103, 320/134, 140, 157–158, 162–163; 307/43–48
See application file for complete search history.

(56) References Cited

U.S. PATENT DOCUMENTS 7,071,652 B2 *    7/2006    Chen ............... 320/125

2005/0253560 A1 *    11/2005    Popescu-Stanesti et al. . 320/138

FOREIGN PATENT DOCUMENTS

JP    06-253467    9/1994

OTHER PUBLICATIONS

English language Abstract of JP 06-253467.

\* cited by examiner

*Primary Examiner*—Akm E Ullah
*Assistant Examiner*—Richard V Muralidar
(74) *Attorney, Agent, or Firm*—Greenblum & Bernstein, P.L.C.

(57) ABSTRACT

A charger capable of safely charging an apparatus even when the current limit value of an external power supply is less than the maximum charging current of the charger or when the battery voltage is low. Charger 100 has backup charging circuit 160 that performs charging using a current that is less than the charging current of charging control section 120. Control circuit 170 performs control so that charging control circuit 123 of charging control section 120 fixes charging control transistor 121 to OFF, makes backup charging circuit 160 operate, and performs backup charging using minute current Ichsub when battery voltage Vb is lower than predetermined value Vbx1, and fixes control transistor 111 of DC/DC converter 110 to ON when supply voltage Vc is less than a first supply voltage value.

5 Claims, 6 Drawing Sheets

BATTERY CHARGER WITH BACKUP CHARGING CIRCUIT

BACKGROUND OF THE INVENTION

1. Field of the Invention

The present invention relates to a charger of a secondary battery, and more particularly to a charger that efficiently charges a secondary battery such as a mobile apparatus.

2. Description of Related Art

In recent years, with the development of high capacity batteries used in mobile apparatuses and the development of safety designs of the mobile apparatuses during use and charging, techniques for safely and efficiently charging secondary batteries are required. The mobile apparatus charging system typically employs a configuration of using an external power supply typified by an AC adapter as the input source, and charging the secondary battery via a charger having a series regulator configuration. The series regulator is provided with a control transistor between the input and output, and controls output voltage (the charging voltage of the secondary battery) and output current (the charging current of the secondary battery) using the control transistor as a variable impedance. Hereinafter, the control transistor will be referred to as the charging control transistor of the charger.

The external power supply is also typically provided with an overcurrent protection function. Standard overcurrent protection has a drooping characteristic whereby, when the output current (that is, the input current for the charger or the charging current to the secondary battery) of the external power supply reaches the limit value, the output voltage of the external power supply (hereinafter referred to as the supply voltage from the external power supply, as viewed from the charger) decreases with the current value maintained. For the charger, the external power supplies can be broadly divided into two types according to the drooping characteristic. One is an external power supply whose current limit value is less than the maximum charging current, and the other is an external power supply whose current limit value is greater than or equal to the maximum charging current.

In the initial charging stage when the secondary battery voltage is low and the charger attempts to charge the battery using the maximum charging current, if the current limit value of the external power supply is less than the maximum charging current of the charger, the supply voltage from the external power supply is drooping and the charging control transistor operates in a saturated state. On the other hand, when the current limit value of the external power supply is greater than or equal to the maximum charging current of the charger, the supply voltage from the external power supply does not decrease, and therefore the difference voltage (Vc−Vb) between supply voltage Vc from the external power supply and voltage Vb of the secondary battery is applied to the charging control transistor, and the loss Pd=(Vc−Vb)×Ichmax obtained by multiplying the difference voltage by the maximum charging current Ichmax occurs.

Patent Document 1 (Japanese Patent Application Laid-Open No. 1994-253467) discloses a charger that is provided with a switching step-down type DC/DC converter between a charging control transistor and an input terminal to which supply voltage is applied from an external power supply, and efficiently lowers the supply voltage from the external power supply using this DC/DC converter and decreases the loss caused by the charging control transistor.

FIG. 1 is a block diagram showing the configuration of the charger described in the above Patent Document 1.

In FIG. 1, 1 is an AC adapter that supplies DC voltage Vc, 2 is a secondary battery, and 10 is a charger. Charger 10 is configured with step-down type DC/DC converter 20 that converts at high efficiency supply voltage Vc to voltage Va, charging control section 30 that performs control of supplying charging current Ich to secondary battery 2 based on voltage Va from step-down type DC/DC converter 20, and voltage difference detection circuit 40 that detects the voltage difference between output voltage Va of DC/DC converter 20 and battery voltage Vb.

Step-down type DC/DC converter 20 is configured with control transistor 21, inductor 22, commutation diode 23, capacitor 24 and DC/DC control section 25, and charging control section 30 is a series regulator configured with charging control transistor 31, charging current detection resistor 32 and charging control circuit 33. The output of voltage difference detection circuit 40 is fed back to DC/DC converter 20, and DC/DC converter 20 controls output voltage Va so that the detected difference voltage (Va−Vb) becomes constant. In step-down type DC/DC converter 20, the difference voltage (Va−Vb) is kept constant, thereby preventing power loss upon supply of charging current Ich in charging control section 30.

FIG. 2 is an operation waveform diagram of each section of the above-mentioned charger 10, and shows the sectional time charts from the initial charging stage, of secondary battery 2 to charge completion. FIG. 2 shows supply voltage Vc from AC adapter 1, output voltage Va of DC/DC converter 20, battery voltage Vb of secondary battery 2 and charging current Ich from charging control section 30. As shown in FIG. 2, in the initial charging stage when battery voltage Vb is low, charging is carried out at a fixed maximum charging current (see CC charging in FIG. 2), and, when battery voltage Vb reaches a predetermined value near the full charge voltage, the charging switches to constant voltage charging (see CV charging in FIG. 2). During all periods, output voltage Va of DC/DC converter 20 changes in response to the change of battery voltage Vb. Thus, in the initial charging stage when battery voltage Vb is low, output voltage Va becomes a low value, and the power loss of charging control section 30 during CC charging decreases as expressed by Pd=(Va−Vb)×Ichmax. Furthermore, the power loss of the overall charger 10 requires consideration of the loss for DC/DC, which is expressed by the following equation 1. Thus, the total power loss of charger 10 is expressed by the following equation 2.

$$Pd(DC/DC)=Va \times Ich\max \times (1-\text{efficiency rate})/\text{efficiency rate} \quad \text{(Equation 1)}$$

$$Pd=(Va-Vb) \times Ich\max + Va \times Ich\max \times (1-\text{efficiency rate})/\text{efficiency rate} \quad \text{(Equation 2)}$$

However, in such a charger of prior art, there is a problem that the operation of the DC/DC converter becomes unstable when the current limit value of the external power supply is less than the maximum charging current of the charger or when the battery voltage is low.

For example, charger 10 having the configuration of FIG. 1 is designed under the premise that the current limit value of the external power supply is greater than or equal to the maximum charging current Ichmax of charger 10. When the current limit value of the external power supply is less than the maximum charging current Ichmax of charger 10, supply voltage Vc from the external power supply, which is the input voltage of DC/DC converter 20, decreases during CC charging of the initial charging stage, and therefore the operation of DC/DC converter 20 becomes unstable. DC/DC converter 20 controls output voltage Va so that the detected difference voltage (Va−Vb) becomes constant, and therefore, when supply voltage Vc is extremely small, DC/DC converter 20 becomes saturated, and the operation becomes unstable. That is, although the operation is not performed as difference voltage output operation of DC/DC converter 20, power is supplied to DC/DC converter 20, and therefore the operation results in a meaningless waste of power and the amplification of noise. Thus, in terms of safety, it is not preferable that charging control section 30 performs charging when the operation of DC/DC converter 20 is unstable.

In addition, there is a risk of causing damage to secondary battery 2 if quick charging is performed at the maximum charging current when the battery voltage is low. For example, in the initial charging start stage indicated by CC charging in FIG. 2, if the chargeable charging current is supplied to secondary battery 2 to the fullest, secondary battery 2 is damaged, resulting in deterioration, and further, causing the risk of heat generation.

SUMMARY OF THE INVENTION

It is therefore an object of the present invention to provide a charger capable of safely charging a secondary battery without causing damage to the secondary battery even when the current limit value of the external power supply is less than the maximum charging current of the charger or when the battery voltage is low.

According to an aspect of the invention, a charger that receives power supply from an external power supply and charges a secondary battery, has: a DC/DC converter that receives supply voltage from the external power supply, outputs a predetermined DC voltage when the supply voltage is greater than or equal to a first supply voltage value, and sets a low resistance between the input and output when the supply voltage is less than the first supply voltage value; a charging control section that receives the output voltage of the DC/DC converter and performs control of supplying a predetermined charging current to the secondary battery when the battery voltage of the secondary battery is greater than or equal to a first battery voltage value, and not supplying a charging current when the battery voltage of the secondary battery is less than the first battery voltage value; and a backup charging circuit that receives a supply voltage from the external power supply, and, when the battery voltage of the secondary battery is less than or equal to a second voltage value, performs charging using a current that is less than the charging current of the charging control section.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DESCRIPTION OF THE PREFERRED EMBODIMENT

Now the preferred embodiments of the present invention will be described in detail with reference to the accompanying drawings.

Embodiment 1

Figure 3:
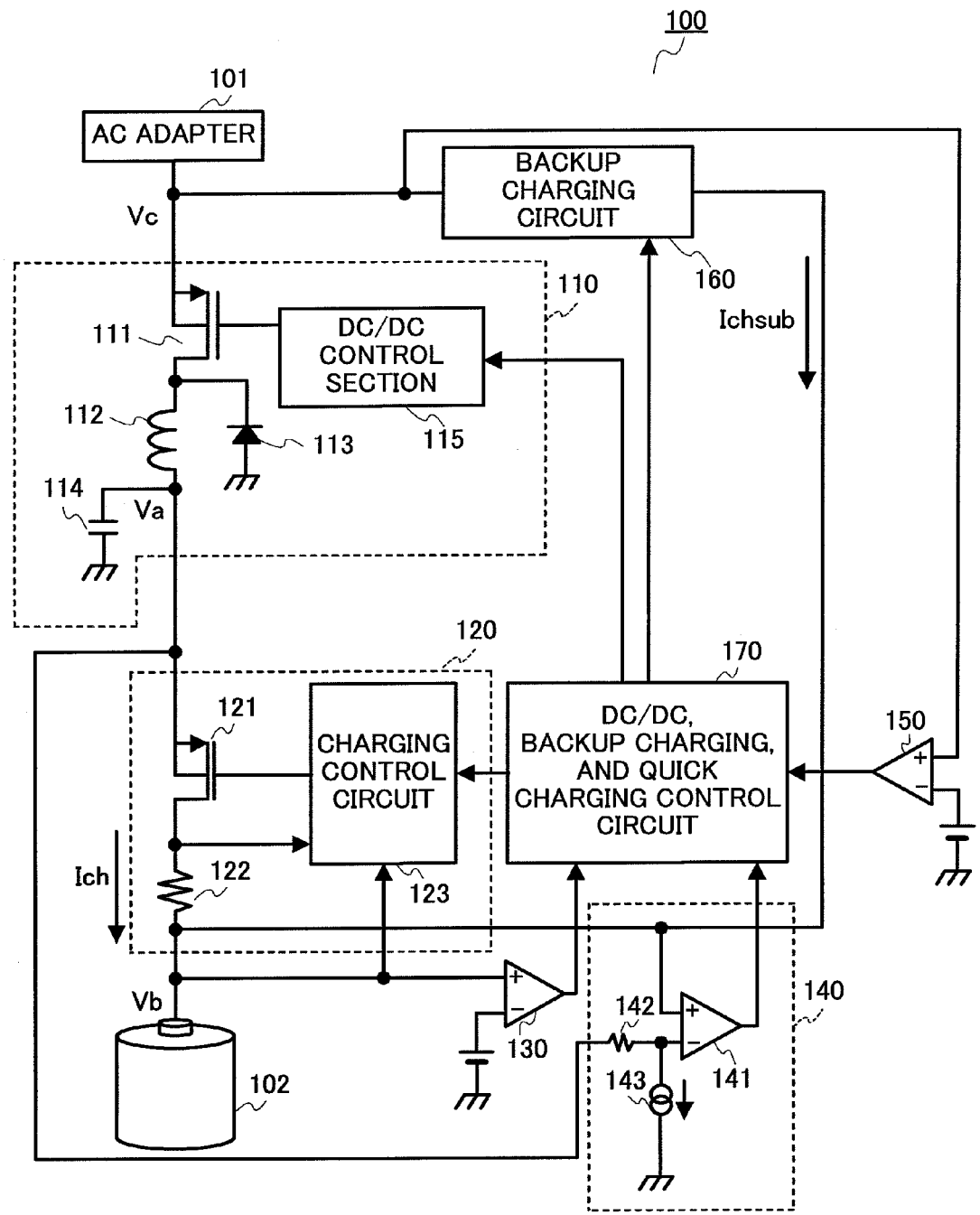
FIG. 3 is a block diagram showing the configuration of the charger according to Embodiment 1 of the present invention.

FIG. 3 is a block diagram showing the configuration of the charger according to Embodiment 1 of the present invention. This embodiment is an example of application to a charger of a mobile apparatus.

In FIG. 3, 101 is an AC adapter that supplies DC voltage Vc, 102 is a secondary battery, and 101 is a charger. Charger 100 has: step-down type DC/DC converter 110 that converts at high efficiency supply voltage Vc to voltage Va; charging control section 120 that performs control of supplying charging current Ich to secondary battery 102 based on voltage Va from DC/DC converter 110; comparator 130 that compares battery voltage Vb of secondary battery 102 with a reference voltage; voltage difference detection circuit 140 that detects the difference voltage between output voltage Va of DC/DC converter 110 and battery voltage Vb; comparator 150 that compares DC voltage Vc of AC adapter 101 with the reference voltage; backup charging circuit 160 that performs charging using a current that is less than the charging current of charging control section 120 when battery voltage Vb of secondary battery 102 is less than or equal to a predetermined voltage value; and DC/DC, backup charging and quick charging control circuit (hereinafter simply "control circuit") 170 that controls DC/DC converter 110, charging control section 120 and backup charging circuit 160 based on the output of comparator 130, voltage difference detection circuit 140 and comparator 150.

DC/DC converter 110 has control transistor 111 which is the main switch element, inductor 112, commutation diode 113, capacitor 114 and DC/DC control section 115. DC/DC converter 110 receives supply voltage from the external power supply (here, AC adapter 101), outputs a predetermined DC voltage when the supply voltage is greater than or equal to a first supply voltage value, and sets a low resistance between the input and output when the supply voltage is less than the first supply voltage value.

Specifically, DC/DC converter 110 is a step-down type switching regulator that has DC/DC control section 115 that connects control transistor (main switch element) 111 and inductor 112 in series between the input and output of DC/DC converter 110 and controls the ON/OFF operation of control transistor 111. DC/DC control section 115 receives a control signal from control circuit 170, controls control transistor 111 so that the output voltage of DC/DC converter 110 is higher than battery voltage Vb of secondary battery 102 by just a third voltage value when supply voltage Vc from external power supply 101 is greater than or equal to the first supply voltage value, and fixes control transistor 111 to ON when supply voltage Vc is less than the first supply voltage value.

Charging control section 120 is a series regulator configured with charging control transistor 121, charging current detection resistor 122 and charging control circuit 123. Charging control section 120 receives the output voltage of DC/DC converter 110, supplies a predetermined charging current to secondary battery 102 when battery voltage Vb of secondary battery 102 is greater than or equal to the first battery voltage value, and does not supply charging current when battery voltage Vb of the secondary battery is less than the first battery voltage value.

Specifically, charging current section 120 is a series regulator having charging control transistor 121 connected between the input and output of charging control section 120, charging current detection resistor 122 that detects the current of charging control transistor 121, and charging control circuit 123 that excites charging control transistor 121 based on the output of charging current detection resistor 122 and battery voltage Vb of secondary battery 102. Charging control circuit 123 sets charging control transistor 121 to OFF when battery voltage Vb of secondary battery 102 is less than the first battery voltage value, excites charging control transistor 121 so that the current of charging control transistor 121 becomes constant when battery voltage Vb of secondary battery 102 is greater than or equal to the first battery voltage value and less than the second battery voltage value which is near the full charge voltage, and excites charging control transistor 121 so that battery voltage Vb of secondary battery 102 or the output voltage of charging control transistor 121 becomes constant when battery voltage Vb of secondary battery 102 reaches the second battery voltage value.

Comparator 130 compares battery voltage Vb of secondary battery 102 with the reference voltage and detects that secondary battery 102 is at a predetermined battery voltage (charging complete voltage, for example).

Voltage difference detection circuit 140 is configured with differential amplifier 141, resistor 142 and constant current source 143, and detects the difference voltage between output voltage Va of DC/DC converter 110 and battery voltage Vb.

Backup charging circuit 160 is configured with a series regulator similar to that of charging control section 120, and operates according to a control signal from control circuit 170 and charges secondary battery 102 using minute current when battery voltage Vb is less than or equal to predetermined value Vbx. At this time, charging control circuit 123 of charging control section 120 fixes charging control transistor 121 to OFF when battery voltage Vb is less than or equal to predetermined value Vbx. Thus, backup charging circuit 160 receives supply voltage from an external power supply, does not supply a charging current to secondary battery 102 when the battery voltage of secondary battery 102 is greater than or equal to the second voltage value, and charges secondary battery 102 using a current that is less than the charging current of charging control section 120 when battery voltage Vb of secondary battery 102 is less than or equal to the second voltage value.

Control circuit 170 has a plurality of control functions (1) to (5) that control DC/DC converter 110, charging control section 120 and backup charging circuit 160 based on the output of comparator 130, voltage difference detection circuit 140 and comparator 150. (1) Control circuit 170 performs DC/DC feedback control of feeding back the detection result of voltage difference detection circuit 140 that detects the difference voltage between output voltage Va of DC/DC converter 110 and battery voltage Vb to DC/DC control circuit 115 of DC/DC converter 110. According to this DC/DC feed back control, DC/DC control circuit 115 adjusts the ON/OFF time of control transistor (main switch element) 111 and controls output voltage Va of DC/DC converter 110 so that the detected difference voltage (Va−Vb) becomes constant. (2) When battery voltage Vb is less than or equal to predetermined value Vbx1, control circuit 170 outputs a control signal to backup charging circuit 160 until battery voltage Vb becomes predetermined value Vbx2, and backup charging circuit 160 charges secondary battery 102 using a minute current. (3) In the case of the above (2), control circuit 170 outputs a control signal to DC/DC control section 115, and DC/DC control section 115 fixes control transistor 111 of DC/DC converter 110 to ON. This prevents the operation of DC/DC converter 110 from becoming unstable. (4) In the case of the above (2), control circuit 170 outputs a control signal to charging control circuit 123 of charging control section 120, and charging control circuit 123 fixes charging control transistor 121 to OFF when battery voltage Vb is less than or equal to predetermined value Vbx1. (5) Control circuit 170 outputs a control signal to each of the above-mentioned circuit sections based on the detection result of the battery voltage of secondary battery 102 from comparator 130, and performs control of quick charging or charge completion.

Figure 4:
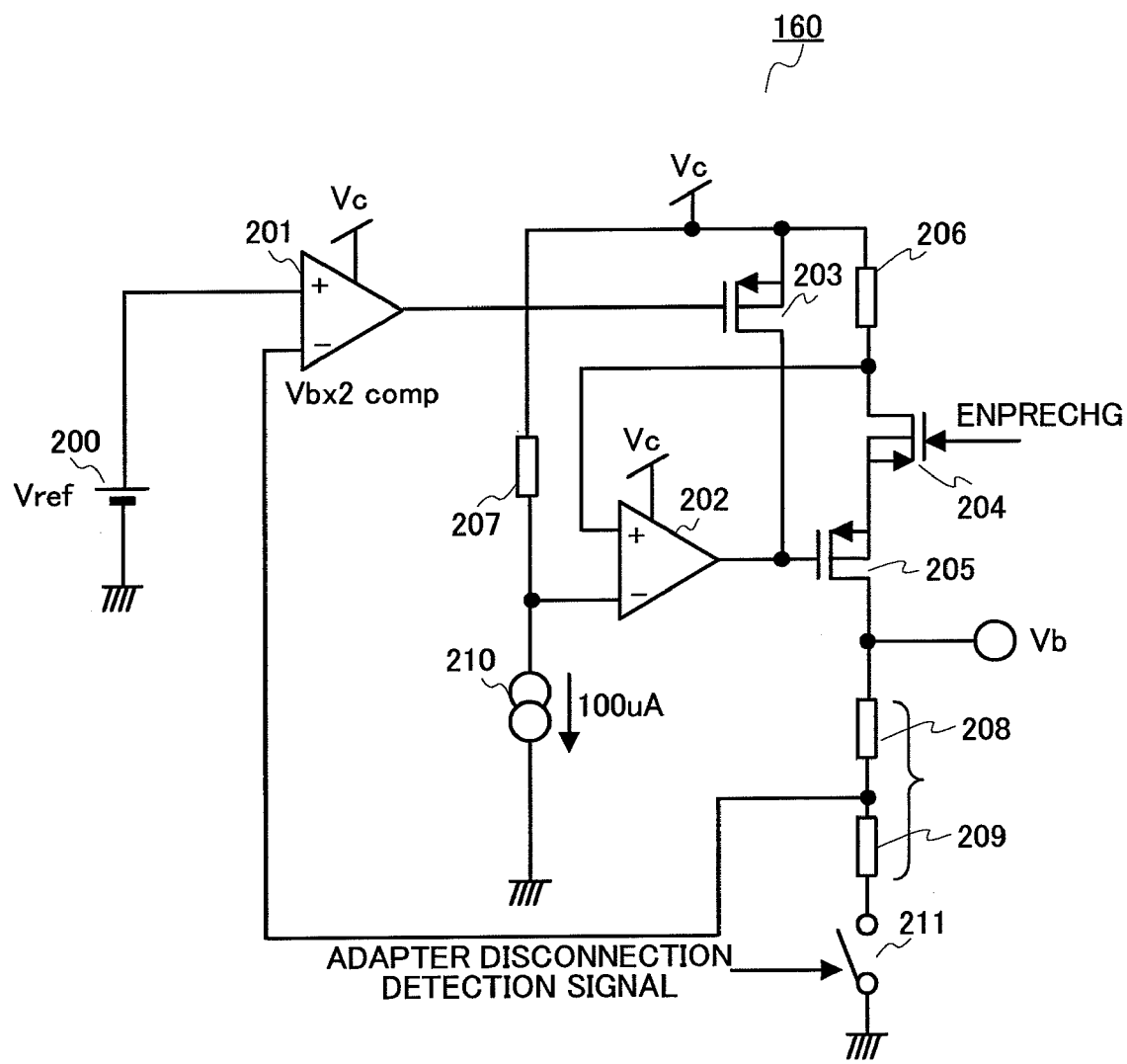
FIG. 4 is a block diagram showing the detailed configuration of the backup charging circuit of the charger according to the above-mentioned Embodiment 1.

FIG. 4 is a circuit diagram showing the detailed configuration of the above-described backup charging circuit 160.

In FIG. 4, backup charging circuit 160 has reference voltage Vref generation section 200, amplifiers 201 and 202, MOS transistors 203 to 205, resistors 206 to 209, constant current source 210 and switch 211 that switches between ON and OFF according to an adapter disconnection detection signal. As shown in the above-described configuration, backup charging circuit 160 has the same configuration as a general-purpose series regulator. The series regulator is suitable when a load is light such as during CPU standby mode, and has a characteristic of a quick response time.

Now, the operation of the charger configured as mentioned above will be described.

First, the charging control operation for the case where current limit value Icmax of external power supply 101 is greater than or equal to maximum charging current Ichmax of charging control section 120 will be described.

Figure 5:
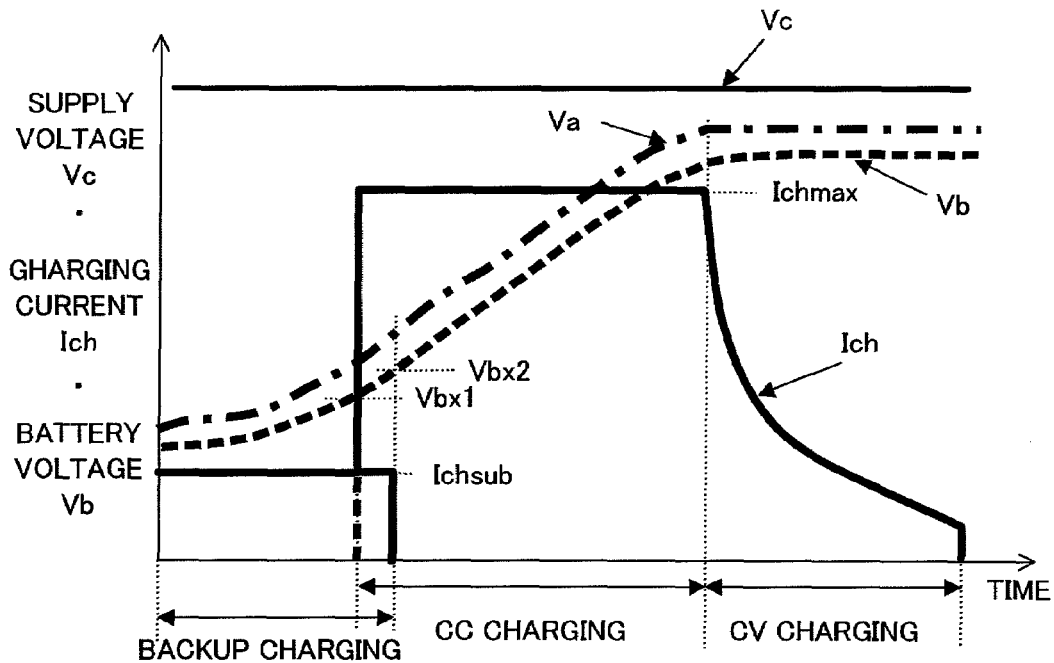
FIG. 5 is an operation waveform diagram of each section of the charger according to the above-mentioned Embodiment 1.

FIG. 5 is an operation waveform diagram of each section of charger 100. FIG. 5 shows the sectional time charts from the initial charging stage to charge completion of secondary battery 102 when current limit value Icmax of external power supply 101 is greater than or equal to maximum charging current Ichmax of charging control section 120. FIG. 5 shows supply voltage Vc from external power supply 101, output voltage Va of DC/DC converter 110, battery voltage Vb of secondary battery 102 and charging current Ich from charging control section 120.

First, in the initial charging stage when battery voltage Vb is less than predetermined value Vbx1, charging control circuit 123 fixes charging control transistor 121 to OFF and performs backup charging such that backup charging circuit 160 operates and charges secondary battery 102 using current Ichsub. Charging current Ichsub is set to a low value so that secondary battery 102 is not damaged even if the battery voltage is low.

When battery voltage Vb rises by backup charging, exceeds predetermined value Vbx1, and reaches predetermined value Vbx2, charging control circuit 123 receives a control signal from control circuit 170 and stops backup charging circuit 160. In addition, when battery voltage Vb rises by backup charging and exceeds predetermined value Vbx1, charging control transistor 121 is made to be an active state, and the charging shifts to CC charging (see CC charging in FIG. 5) which performs quick charging using maximum charging current Ichmax. Then, when battery voltage Vb reaches predetermined value Vbmax which is near the full charge voltage, the charging switches to constant voltage charging (see CV charging in FIG. 5). As shown by the overlap of CV charging and CC charging in FIG. 5, even if constant voltage charging by charging control section 120 starts, the charging of a low current by backup charging circuit 160 continues until battery voltage Vb reaches predetermined value Vbx2 by backup charging, and instantaneous interruption is prevented.

On the other hand, during all periods, DC/DC converter 110 operates so that (Va−Vb) becomes constant, and voltage Va changes in response to the change of battery voltage Vb.

Next, the charging control operation for the case where current limit value Icmax of external power supply 101 is less than maximum charging current Ichmax of charging control section 120 will be described.

Figure 6:
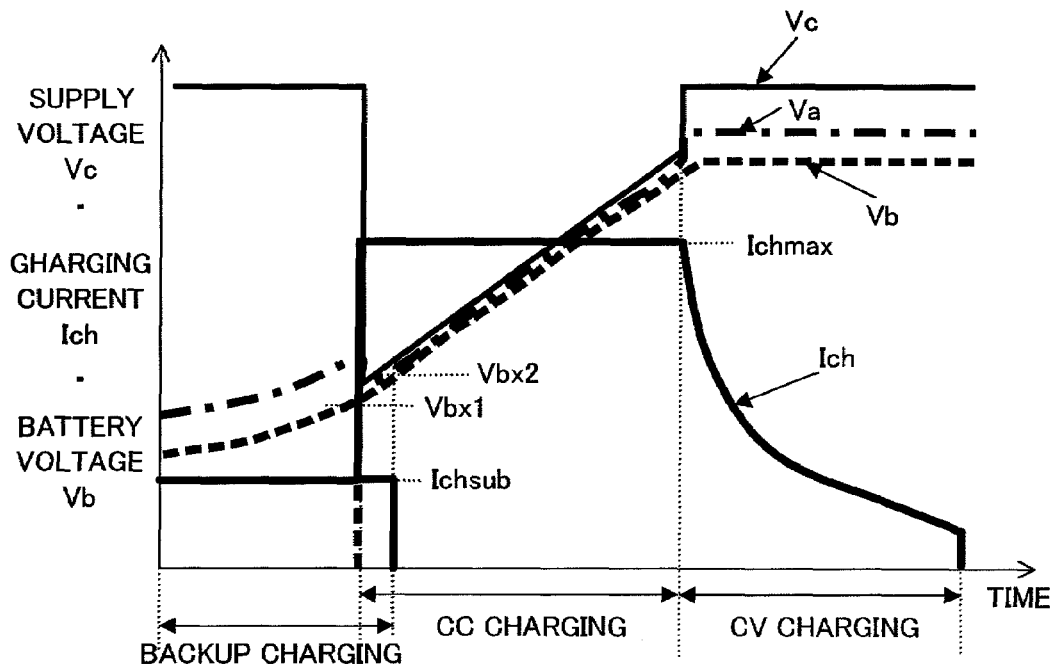
FIG. 6 is an operation waveform diagram of each section of the charger according to the above-mentioned Embodiment 1.

FIG. 6 is an operation waveform diagram of each section of charger 100. FIG. 6 shows the sectional time charts from the initial charging stage to charge completion of secondary battery 102 when current limit value Icmax of external power supply 101 is less than maximum charging current Ichmax of charging control section 120. FIG. 6 shows supply voltage Vc from external power supply 101, output voltage Va of DC/DC converter 110, battery voltage Vb of secondary battery 102 and charging current Ich from charging control section 120.

First, in the initial charging stage when battery voltage Vb is lower than predetermined value Vbx1, charging control circuit 123 receives a control signal from control circuit 170 and fixes charging control transistor 121 to OFF, and backup charging circuit 160 operates to perform backup charging such that secondary battery 102 is charged using minute current Ichsub. At this time, DC/DC converter 110 operates so that (Va−Vb) becomes constant, and voltage Va changes in response to the change of battery voltage Vb.

When battery voltage Vb rises by backup charging, exceeds predetermined value Vbx1, and reaches predetermined value Vbx2, charging control circuit 123 receives a control signal from control circuit 170 and stops backup charging circuit 160. In addition, when battery voltage Vb rises by backup charging and exceeds predetermined value Vbx1, charging control transistor 121 is made to be an active state, and the charging shifts to CC charging (see CC charging in FIG. 6) which performs quick charging using maximum charging current Ichmax. As shown by the overlap of CV charging and CC charging in FIG. 6, even if constant voltage charging by charging control section 120 starts, the charging of a low current by backup charging circuit 160 continues until battery voltage Vb reaches predetermined value Vbx2 by backup charging.

Here, as can be understood by comparison of charging current Ich of FIG. 5 and charging current Ich of FIG. 6, current limit value Icmax of external power supply 101 is less than maximum charging current Ichmax of charging control section 120, and therefore charging current Ich is limited to current limit value Icmax of external power supply 101 and supply voltage Vc decreases. When DC/DC converter 110 receives a control signal from control circuit 170 which detects the decrease of supply voltage Vc, DC/DC converter 110 fixes control transistor (main switch element) 111 to ON. Therefore, during CC charging shown in FIG. 6, constant current charging is performed using current limit value Icmax of external power supply 101. The difference (Va−Vb) between output voltage Va of DC/DC converter 110 and battery voltage Vb of secondary battery 102 becomes substantially equal to the product of resistance value Rs of detection resistor 122 and charging current Icmax, that is, Rs×Icmax.

After a while, when battery voltage Vb reaches predetermined value Vbmax which is near the full charge voltage, the charging switches to constant voltage charging (see CV charging in FIG. 6). Once again, DC/DC converter 110 operates so that (Va−Vb) becomes constant, and voltage Va changes in response to the change of battery voltage Vb. In addition, according to the decrease of charging current Ich, external power supply 101 changes from the drooping operation back to the normal operation, and supply voltage Vc also changes to the normal value.

As described above, when battery voltage Vb of the initial charging stage is less than or equal to a predetermined value, backup charging circuit 160 performs charging using the low current Ichsub, so that it is possible to reduce the amount of damage to secondary battery 102. In addition, during CC charging, when supply voltage Vc from external power supply 101 is less than or equal to a predetermined value, control transistor (main switch element) 111 of DC/DC converter 110 is set to ON, and supply voltage Vc from external power supply 101 is supplied as is to charging control section 120. By this means, the operation of DC/DC converter 110 becomes stable regardless of low input.

Figure 1:
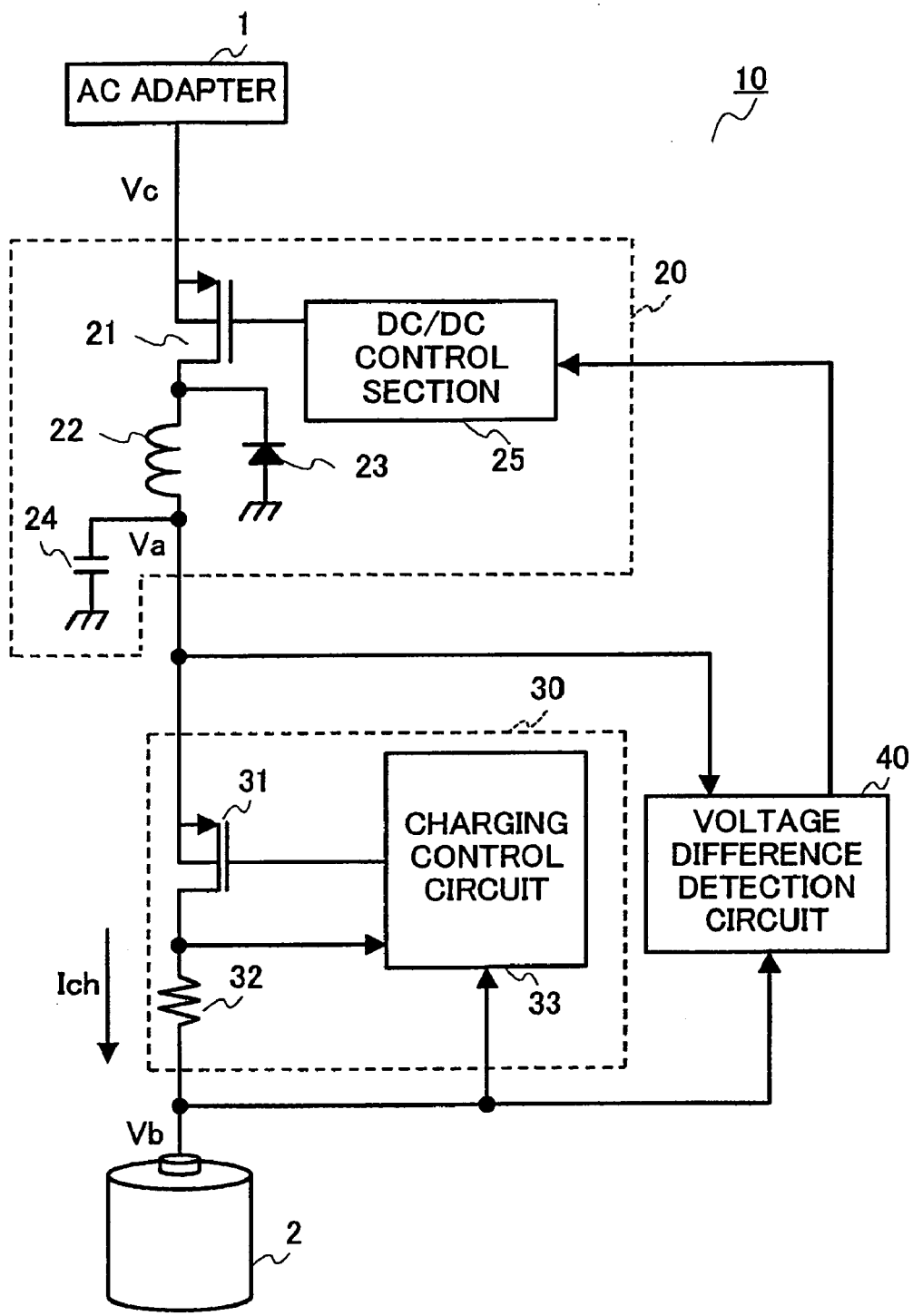
FIG. 1 is a block diagram showing the configuration of a charger of prior art.
Figure 2:
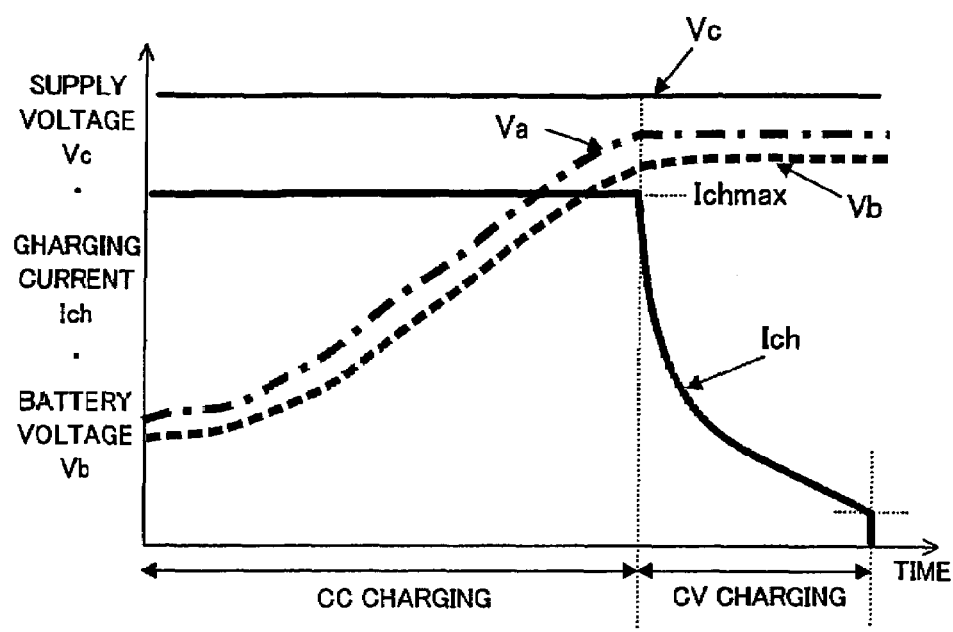
FIG. 2 is an operation waveform diagram of each section of a charger of prior art.

As described above, according to this embodiment, charger 100 has: DC/DC converter 110 that operates so that the difference (Va−Vb) between output voltage Va of secondary battery 102 and battery voltage Vb becomes constant; charging control section 120 that performs control of supplying charging current Ich to secondary battery 102 based on voltage Va from DC/DC converter 110; backup charging circuit 160 that performs charging using a current less than the charging current of charging control section 120 when battery voltage Vb of secondary battery 102 is less than or equal to a predetermined voltage value; and control circuit 170 that controls DC/DC converter 110, charging control section 120 and backup charging circuit 160 based on the output of comparator 130, voltage difference detection circuit 140 and comparator 150, wherein control circuit 170 performs control so that, when battery voltage Vb is less than predetermined value Vbx1, charging control circuit 123 of charging control section 120 fixes charging control transistor 121 to OFF and makes backup charging circuit 160 operate to perform backup charging of charging secondary battery 102 using minute current Ichsub, and, when supply voltage Vc is less than the first supply voltage value, charging control circuit 123 fixes control transistor 111 of DC/DC converter 110 to ON. That is, when battery voltage Vb is less than predetermined value Vbx1, a current is supplied not by the primary charging control system but through backup charging circuit 160, and charging is switched to primary charging at the stage where battery voltage Vb rises to a predetermined degree. In addition, the output of DC/DC converter 110 in the unstable operation range is stopped, and control is performed so as to always set control transistor 111 and charging control transistor 121 to ON. As a result, when current limit value Icmax of external power supply 101 is less than the maximum charging current of charger 100, even if supply voltage Vc is low due to the drooping characteristic of external power supply 101, control transistor 111 of DC/DC converter 110 is in an ON state, so that it is possible to avoid unstable operation of DC/DC converter and perform stable charging. This case supports a case where battery voltage Vb of the initial charging stage is low and suppresses a charging current by backup charging, and therefore an effect can be obtained that achieves safe charging which does not damage secondary battery 102. As in the prior art example shown in FIG. 2, compared to the case where the maximum current is applied at the rated value, it is clear that secondary battery 102 is not damaged by charging using a charging current less than the charging current by backup charging as shown in FIG. 5 and FIG. 6.

In addition, in this embodiment, when battery voltage Vb is lower than predetermined value Vbx1, backup charging circuit 160 starts and continues backup charging until battery voltage Vb rises and reaches predetermined value Vbx2, so that it is possible to eliminate discontinuity in current supply and reliably supply charging.

Furthermore, in this embodiment, control circuit 170 controls the backup charging period of backup charging circuit 160 based on the detection result of battery voltage Vb. This control is preferable in that, since the backup charging of backup charging circuit 160 is stopped after it is confirmed that battery voltage Vb has reached predetermined value Vbx2, backup charging can be reliably performed regardless of the charged state of the battery, but, as a simple configuration, it is also possible to perform backup charging for a predetermined period of time using a timer or the like.

In addition, in this embodiment, control is performed so that control transistor (main switch element) 111 of DC/DC converter 110 is set to ON, but it is also possible to disconnect the input of the power transistor to DC/DC converter 110 or the power supply of the amplifier. This results in a power saving effect.

Embodiment 2

Embodiment 2 is an example where charging is switched to CC charging which performs quick charging using maximum charging current Ichmax immediately after backup charging by backup charging circuit 160. The hardware configuration of the charger according to Embodiment 2 of the present invention is the same as that of charger 100 of FIG. 3 and FIG. 4, and a description thereof is omitted.

First, the charging control operation for the case where current limit value Icmax of external power supply 101 is greater than or equal to maximum charging current Ichmax of charging control section 120 will be described.

Figure 7:
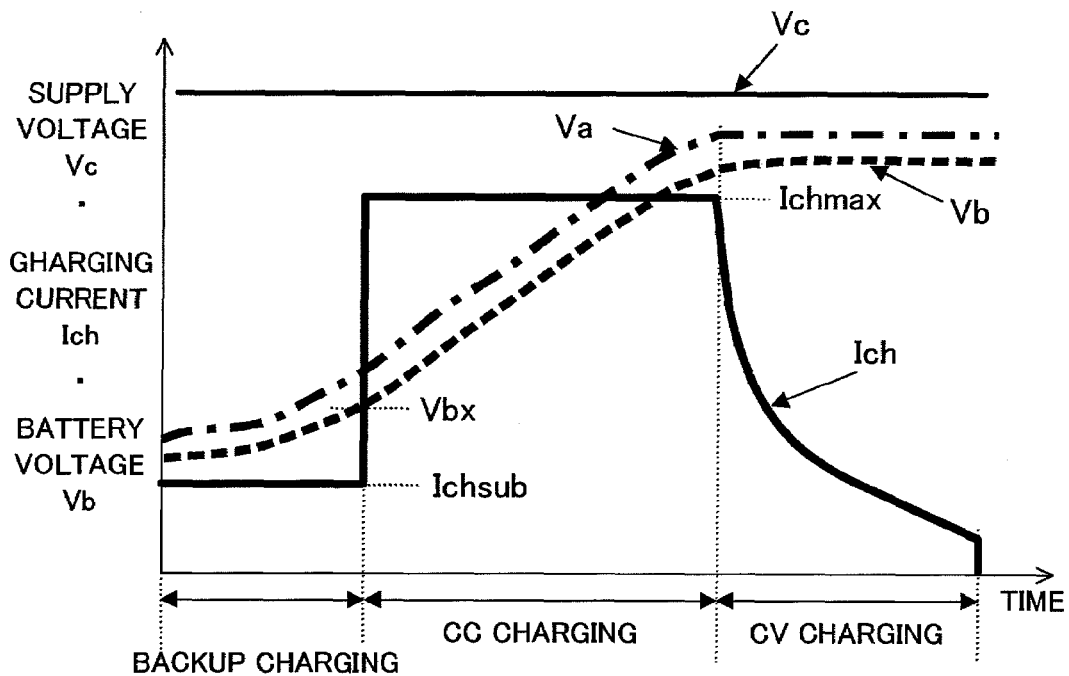
FIG. 7 is an operation waveform diagram of each section of the charger according to Embodiment 2 of the present invention.

FIG. 7 is an operation waveform diagram of each section of charger 100. FIG. 7 shows the sectional time charts from the initial charging stage to charge completion of secondary battery 102 when current limit value Icmax of external power supply 101 is greater than or equal to maximum charging current Ichmax of charging control section 120. FIG. 7 shows supply voltage Vc from external power supply 101, output voltage Va of DC/DC converter 110, battery voltage Vb of secondary battery 102 and charging current Ich from charging control section 120.

First, in the initial charging stage when battery voltage Vb is lower than predetermined value Vbx, charging control circuit 123 fixes charging control transistor 121 to OFF, makes backup charging circuit 160 operate to perform backup charging of charging secondary battery 102 using current Ichsub. Charging current Ichsub is set to a low value so that secondary battery 102 is not damaged even if the battery voltage is low.

When battery voltage Vb rises by backup charging and exceeds predetermined value Vbx, charging control circuit 123 receives a control signal from control circuit 170, stops backup charging circuit 160, makes charging control transistor 121 to be an active state, and shifts the charging to CC charging (see CC charging of FIG. 7) that performs quick charging using maximum charging current Ichmax. Then, when battery voltage Vb reaches predetermined value Vbmax which is near the full charge voltage, the charging switches to constant voltage charging (see CV charging in FIG. 7). On the other hand, during all periods, DC/DC converter 110 operates so that (Va−Vb) becomes constant, and voltage Va changes in response to the change of battery voltage Vb.

Next, the charging control operation for the case where current limit value Icmax of external power supply 101 is less than maximum charging current Ichmax of charging control section 120 will be described.

Figure 8:
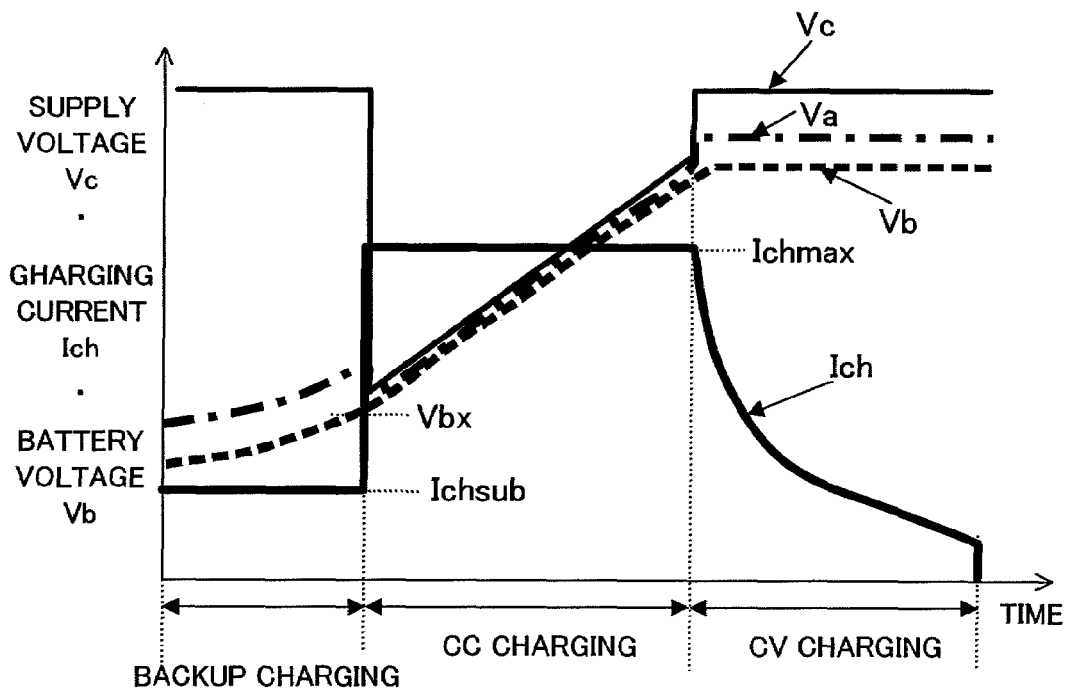
FIG. 8 is an operation waveform diagram of each section of the charger according to the above-mentioned Embodiment 2.

FIG. 8 is an operation waveform diagram of each section of charger 100. FIG. 8 shows the sectional time charts from the initial charging stage to charge completion of secondary battery 102 when current limit value Icmax of external power supply 101 is less than maximum charging current Ichmax of charging control section 120. FIG. 8 shows supply voltage Vc from external power supply 101, output voltage Va of DC/DC converter 110, battery voltage Vb of secondary battery 102 and charging current Ich from charging control section 120.

First, in the initial charging stage when battery voltage Vb is lower than predetermined value Vbx, charging control circuit 123 receives a control signal from control circuit 170 and fixes charging control transistor 121 to OFF, and backup charging circuit 160 operates to perform backup charging of charging secondary battery 102 using minute current Ichsub. At this time, DC/DC converter 110 operates so that (Va−Vb) becomes constant, and voltage Va changes in response to the change of battery voltage Vb.

When battery voltage Vb rises by backup charging and exceeds predetermined value Vbx, charging control circuit 123 stops backup charging circuit 160, makes charging control transistor 121 to be an active state, and shifts the charging to CC charging (see CC charging of FIG. 8) that performs quick charging using maximum charging current Ichmax.

Here, as can be understood by comparison of charging current Ich of FIG. 7 and charging current Ich of FIG. 8, current limit value Icmax of external power supply 101 is less than maximum charging current Ichmax of charging control section 120, and therefore charging current Ich is limited to current limit value Icmax of external power supply 101, and supply voltage Vc decreases. When DC/DC converter 110 receives a control signal from control circuit 170 which detects the decrease of supply voltage Vc, DC/DC converter 110 fixes control transistor (main switch element) 111 to ON. Thus, during the CC charging shown in FIG. 8, constant current charging is performed using current limit value Icmax of external power supply 101. The difference (Va−Vb) between output voltage Va of DC/DC converter 110 and battery voltage Vb of secondary battery 102 becomes substantially equal to the product of resistance value Rs of detection resistor 122 and charging current Icmax, that is, Rs×Icmax.

After a while, when battery voltage Vb reaches predetermined value Vbmax which is near the full charge voltage, the charging switches to constant voltage charging (see CV charging in FIG. 8). Once again, DC/DC converter 110 operates so that (Va−Vb) becomes constant, and voltage Va changes in response to the change of battery voltage Vb. In addition, according to the decrease of charging current Ich, external power supply 101 changes from the dropping operation back to the normal operation, and supply voltage Vc also changes to the normal value.

Thus, according to this embodiment, similar to Embodiment 1, when battery voltage Vb of the initial charging stage is less than or equal to a predetermined value, backup charging circuit 160 performs charging using low current Ichsub, so that it is possible to reduce the amount of damage to secondary battery 102. In addition, during CC charging, when supply voltage Vc from external power supply 101 is less than or equal to a predetermined value, control transistor (main switch element) 111 of DC/DC converter 110 is set to ON, and supply voltage Vc from external power supply 101 is supplied as is to charging control section 120. By this means, the operation of DC/DC converter 110 becomes stable regardless of low input.

The above descriptions are examples of the preferred embodiments of the present invention, but the scope of the invention is not limited thereto.

For example, in each of the above-described embodiments, charger 100 is described as having control circuit 170 and voltage difference detection circuit 140 as independent blocks, but, as is clear from the operation, it is possible to obtain the same effect if control circuit 170 or voltage difference detection circuit 140 is configured so as to be included in DC/DC control circuit 115 of DC/DC converter 110 or charging control circuit 123.

In addition, each of the above-described embodiments is an example of application to a secondary battery, but, if the apparatus has a DC/DC converter and a charging control section that controls the charging current by the output voltage of the DC/DC converter, any circuit configuration may be used. Additionally, the apparatus may be a power supply circuit or a DC-DC converter having the above-described circuit elements.

Although the above-described embodiments use the terms "charger", this term is used for the sake of convenience, and, of course, may be, for example, "regulator", "switching regulator", or "charging control apparatus" as well.

Furthermore, the types, the number, and connection method of circuit sections, such as switch elements, comparators, and amplifiers, configuring the above-described charger, DC/DC converter, and regulator are not limited to those of the above-described embodiments. Typically, a MOS transistor, for example, is used for the switch element, but, any switch element may be used as long as the element performs switching operation.

Thus, according to the present invention, when the current limit value of an external power supply is less than the maximum charging current of a charger, even if the supply voltage is small due to the drooping characteristic of the external power supply, the main switch element of the DC/DC converter is ON, so that it is possible to avoid unstable DC/DC converter operation and realize stable charging. In addition, even when the battery voltage of the initial charging stage is low, the charging current is suppressed by backup charging, so that it is possible to realize safe charging that does not damage the secondary battery.

Thus, the charger according to the present invention is useful as a battery charging system of a mobile apparatus, for example. In addition, the charger according to the present invention may also be broadly applied to chargers of electronic apparatuses other than a mobile apparatus.

The present invention is not limited to the above-described embodiments, and various variations and modifications may be possible without departing from the scope of the present invention.

This application is based on the Japanese Patent Application No. 2006-089154 filed on Mar. 28, 2006, entire content of which is expressly incorporated by reference herein.

What is claimed is:

1. A charger that receives power supply from an external power supply and charges a secondary battery, the charger comprising:
   a DC/DC converter that receives supply voltage from the external power supply, outputs a predetermined DC voltage when the supply voltage is greater than or equal to a first supply voltage value, and sets a low resistance between the input and output when the supply voltage is less than the first supply voltage value;
   a charging control section that receives the output voltage of the DC/DC converter and performs control of supplying a predetermined charging current to the secondary battery when the battery voltage of the secondary battery is greater than or equal to a first battery voltage value, and not supplying a charging current when the battery voltage of the secondary battery is less than the first battery voltage value; and
   a backup charging circuit that receives supply voltage from the external power supply, and, when the battery voltage of the secondary battery is less than or equal to a second voltage value, performs charging using a current that is less than the charging current of the charging control section.

2. The charger according to claim 1, wherein:
   the DC/DC converter comprises a step-down type switching regulator that connects in series the main switch element and inductor between the input and output of the DC/DC converter and comprises a DC/DC control circuit that controls the ON/OFF operation of the main switch element; and
   the DC/DC control circuit controls the main switch element so that the output voltage of the DC/DC converter is higher than the battery voltage of the secondary battery by a third voltage value when the supply voltage is greater than or equal to the first supply voltage value, and fixes the main switch element to ON when the supply voltage is less than the first supply voltage value.

3. The charger according to claim 1, wherein:
   the charging control section comprises a series regulator that comprises a charging control transistor connected between the input and output of the charging control section, a charging current detection section that detects the current of the charging control transistor, and a charging control circuit that receives the output of the charging current detection section and the battery voltage of the secondary battery to excite the charging control transistor; and
   the charging control circuit sets the charging control transistor to OFF when the battery voltage of the secondary battery is less than a first battery voltage value, excites the charging control transistor so that the current of the charging control transistor becomes a constant value when the battery voltage of the secondary battery is greater than or equal to the first battery voltage value and less than a second battery voltage value which is near the full charge voltage, and excites the charging control transistor so that the battery voltage of the secondary battery or the output voltage of the charging control transistor becomes constant when the battery voltage of the secondary battery reaches the second battery voltage value.

4. The charger according to claim 1, wherein the DC/DC converter stops operation by turning OFF the electric current or stops output when the supply voltage is less than the first supply voltage value.

5. The charger according to claim 1, wherein the backup charging circuit receives the supply voltage from the external power supply and does not supply a charging current to the secondary battery when the battery voltage of the secondary battery is greater than or equal to the second voltage value.

* * * * *